(12) United States Patent
Chan et al.

(10) Patent No.: US 7,533,384 B2
(45) Date of Patent: May 12, 2009

(54) JOB ROUTING TO EARLIEST AVAILABLE RESOURCES IN A PARALLEL JOB SCHEDULER

(75) Inventors: Waiman Chan, Poughkeepsie, NY (US); Joseph F. Skovira, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 942 days.

(21) Appl. No.: 10/855,037

(22) Filed: May 27, 2004

(65) Prior Publication Data

US 2005/0289547 A1    Dec. 29, 2005

(51) Int. Cl.
 G06F 9/46 (2006.01)
 G06F 17/30 (2006.01)
 G06F 15/16 (2006.01)

(52) U.S. Cl. .................. 718/102; 718/104; 709/201; 707/1; 707/2

(58) Field of Classification Search ......... 718/100–108; 712/220; 709/225–226, 201; 707/1–2
See application file for complete search history.

(56) References Cited

U.S. PATENT DOCUMENTS

| | | | |
|---|---|---|---|
| 5,689,631 A * | 11/1997 | Chenoweth | 714/11 |
| 6,591,262 B1 * | 7/2003 | MacLellan et al. | 707/2 |
| 6,598,044 B1 * | 7/2003 | Waas et al. | 707/3 |
| 6,625,636 B1 * | 9/2003 | Skovira | 718/102 |
| 6,694,345 B1 * | 2/2004 | Brelsford et al. | 718/100 |
| 6,823,346 B2 * | 11/2004 | MacLellan et al. | 707/104.1 |
| 6,993,763 B2 * | 1/2006 | Hayes, Jr. | 718/102 |
| 7,028,167 B2 * | 4/2006 | Soltis et al. | 712/220 |
| 2002/0198923 A1 * | 12/2002 | Hayes, Jr. | 709/102 |
| 2003/0167389 A1 * | 9/2003 | Soltis et al. | 712/220 |
| 2006/0048157 A1 * | 3/2006 | Dawson et al. | 718/104 |
| 2006/0069773 A1 * | 3/2006 | Clark | 709/225 |

OTHER PUBLICATIONS

Abawaiy et al., "Parallel Job Scheduling on Multicluster Computing System", IEEE, 2003, pp. 1-8.*
Thanalapati et al., "An Efficient Adaptive Scheudling Scheme for Distributed Memory Multicomputers", IEEE, 2001, pp. 758-768.*

* cited by examiner

Primary Examiner—Thomas Lee
Assistant Examiner—Jennifer N To
(74) Attorney, Agent, or Firm—Geraldine D. Monteleone, Esq.; Lawrence D. Cutter, Esq.; Heslin Rothenberg Farley & Mesiti P.C.

(57) ABSTRACT

A method is provided for starting a job in a parallel batch job data processing system in which a job is submitted to a scheduler having available, for use, a plurality of resource classes in the data processing system and by also including, within the job, instructions which cause notification of job starting to the scheduler and then, upon this notification, removing the job from all but the first resource class on which it is started.

4 Claims, 1 Drawing Sheet

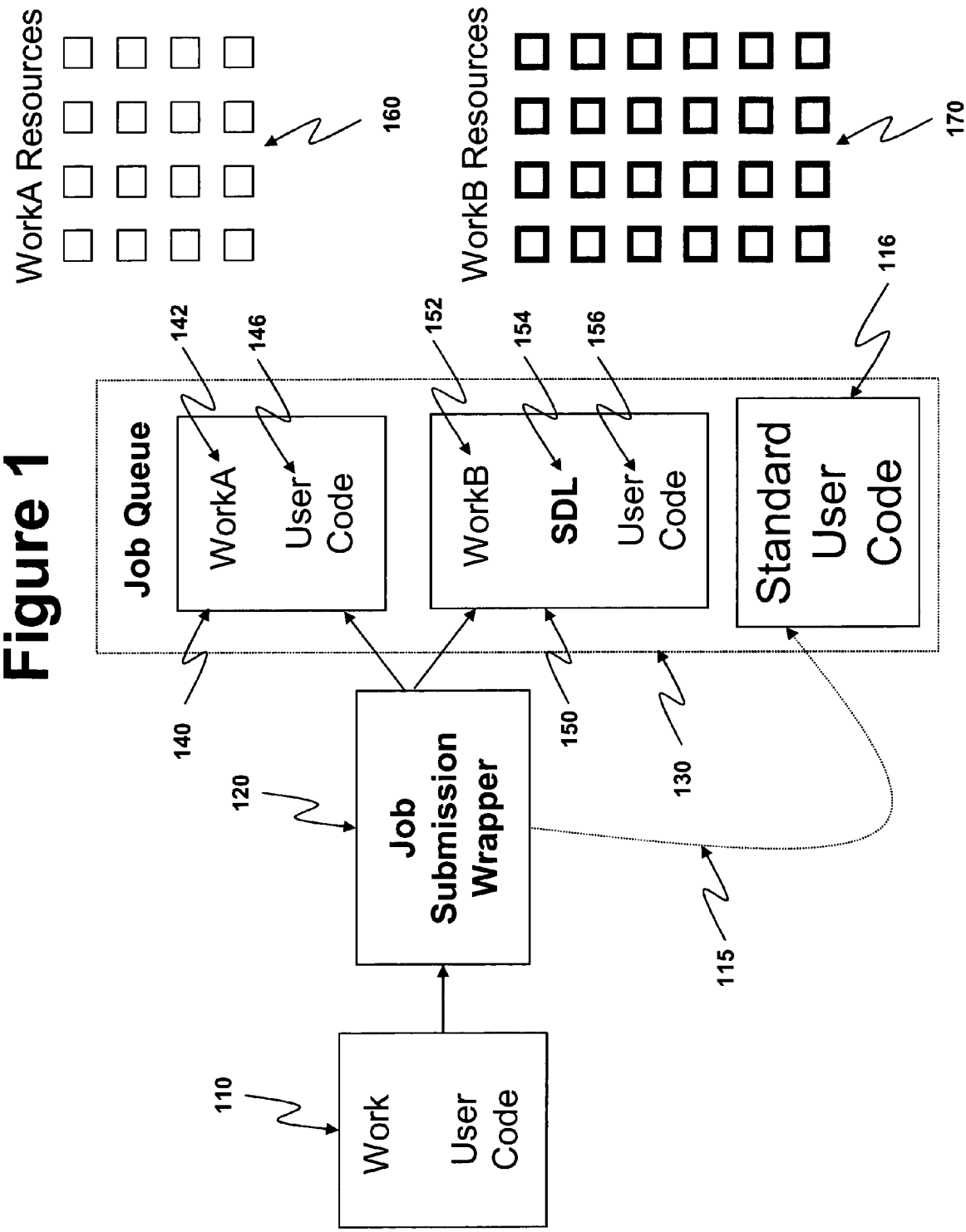

JOB ROUTING TO EARLIEST AVAILABLE RESOURCES IN A PARALLEL JOB SCHEDULER

BACKGROUND OF THE INVENTION

The present invention is generally directed to the problem of scheduling jobs to run in a parallel batch data processing system. More particularly, the present invention is directed to a system and method for ensuring the early starting of a job on a system component that is best able to handle it. Even more particularly, the present invention is directed to the use of such methods in data processing systems which include a mix of older and newer hardware components.

Parallel batch job schedulers for High Performance Computing (HPC) Machines are well known. Some current examples include IBM LoadLeveler, Sun GridEngine, Platform LSF and openPBS. In order to control the allocation of resources, individual computing nodes are grouped into job classes (also known as queues in some implementations). Note that nodes may be grouped into more than one job class at a time. Using this technique, resources are segregated for whatever reasons system a administrator desires. Often, HPC users upgrade systems yet retain older hardware in the same system. This results in a mix of nodes with different capabilities. If these different nodes are included in an identical job class, availability of mixed nodes for a single job often results in an overall job slowdown since parallel jobs tend to run only as fast as the slowest resource. It is natural, then, to segregate these different technologies into different job classes, for example, old and new. Once segregated, many jobs may run on either job class.

However, at job submission time, the user is not able to predict which job class provides free resources at the earliest time. If a poor selection is made, the job may wait for resources of one class to become free while the alternate class nodes are idle. Predictive techniques are difficult since dynamic changes in the job queue for both classes and jobs can occur at random times. Examples of random changes include jobs completing early, additional user jobs entering the job queue, and jobs deleted from the queue by users. The problem then is to provide a utility which delivers free resources from a set of disjoint job classes to an idle job on the job queue, with the intention of obtaining resources for the job as early as possible.

SUMMARY OF THE INVENTION

In accordance with a preferred embodiment of the present invention, a method is provided for starting a job in a parallel batch job data processing system in which a job is submitted to a scheduler having available, for use, a plurality of resource classes in the data processing system and by then removing the job from all but the first resource class on which it is started.

In accordance with another embodiment of the present invention, a method is provided for starting a job in a parallel batch job data processing system in which a job is submitted to a scheduler having available, for use, a plurality of resource classes in the data processing system and by also including, within the job, instructions which cause notification of job starting to the scheduler and then, upon this notification, removing the job from all but the first resource class on which it is started.

At a high level the present invention can be likened to arriving at a supermarket checkout with six of your children and having them wait on separate lines for the first available checkout clerk. When the first clerk becomes available, the corresponding child returns to the parent who then proceeds immediately to this first clerk. The other children then cease waiting on line.

Accordingly, it is an object of the present invention to assist a job submitted to a data processing system to obtain resources for the job as early as possible.

It is also an object of the present invention to improve the operation of job scheduling in parallel batch data processing systems in which resources classes have a varied mix of capabilities.

It is a still further object of the present invention to assist submitted jobs in obtaining resources early in data processing systems which include a mixture of old and new hardware components.

It is yet another object of the present invention to extend the useful life of older hardware data processing system components.

It is yet another object of the present invention to render more useful data processing systems that are deliberately established from a disparate mixture of hardware components having a variety of capacities, as opposed to systems which have naturally grown into such configurations as the result of hardware additions and upgrades.

It is a still further object of the present invention to provide simplicity in job scheduler design.

It is also an object of the present invention to provide a scheduler design which can be implemented without modifications of current scheduling products.

It is still another object of the present invention to provide customization opportunities for the data processing system administrator.

It is also an object of the present invention to improve the utilization of data processing systems by reducing the likelihood of a situation in which a resource available on a job class (queue) sits idle while jobs on another queue are waiting to run.

Lastly, but not limited hereto, it is an object of the present invention to enhance job scheduler capability using existing software structures.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 1 is a block diagram illustrating the structural components and the work flow of the present invention.

DETAILED DESCRIPTION OF THE INVENTION

In accordance with a preferred embodiment of the present invention, there is provided a method in which users submit a job to a parallel batch scheduling system which then starts the job on the earliest set of resources that the scheduler discovers from a number of disjoint resource classes. The solution is provided outside of the conventional scheduler code, therefore, no changes are necessary in batch scheduler software. In the basic operations of the present invention, a number of functionally identical jobs are submitted to different resource classes. Each job contains some degree of additional logic to determine the status of the jobs submitted to the other resource classes. This additional function includes synchronization logic to insure that only one job from the entire set is started. The job that starts is the first job to obtain sufficient resources. The remaining jobs are eliminated from the queue.

The present invention describes a method whereby the user can submit a job to a job scheduler that the scheduler will run on the first of two (or more) segregated resource sets. For the problem description, assume that the user has 2 job classes that segregate node resources based on a consistent feature. For example, nodes in job class "workA" may be older nodes with slower CPUs while nodes in job class "workB" are newer, faster nodes. The administrator for the scheduler defines both job classes in the scheduler software. Assuming the user is running IBM LoadLeveler, these definitions would appear in the LoadL_admin file as workA and workB class stanzas. Further, each resource in the machine would be able to run either workA or workB jobs (specified by the Loadleveler administrator for the scheduler in the LoadL local configuration files using the "class" keyword).

In a first aspect of the present invention, a third job class, "work" is introduced (in addition to the "workA" and "workB" job classes referred to above). Any other convenient name could be used, the choice being solely determined by convenience, conveyance of functional meaning and lack of name conflicts. The "work" class is not designed to run any jobs, but rather is designed to provide a job class to which the users may submit jobs which they want to run on either workA or workB nodes, whichever are available first. FIG. 1 illustrates the relationship between the three classes. If a user elects to submit a job to work class 110, the user is assumed to intend the job to run on either node workA (140) or node workB (150), whichever class has resources available first. FIG. 1 also illustrates new structure which includes job submission wrapper 120 and state detection logic (SDL) 154 which is inserted into the job script. Job submit wrapper 120 generates two jobs (workA and workB, 142 and 152, respectively) when the special job class, "work," is submitted. In addition, state detection logic 154 monitors the progress of both submitted jobs on the job queue.

FIG. 1 illustrates the relationship of the jobs, workA and workB. It is noted that, while for ease of presentation and discussion, the current description is couched in terms of two jobs, the scope of the present invention includes any convenient number of jobs. Job Submission Wrapper 120 creates jobs workA 142 and workB 152 when it detects the submission of a special "work" job class. To the workB job, state detection logic (SDL) 154 is added which detects the start of workA 142 and workB 152 jobs. Different resources, 160 and 170, are also shown in FIG. 1 as being available for workA 142 and for workB 152 respectively.

Job Submission Wrapper 120 is designed to provide the function desired by the user. Job Submission Wrapper 120 looks for special job classes (such as work) and handles these job classes differently. Conversely, jobs submitted to ordinary job classes are simply to be submitted to the job scheduler as illustrated by path 115 to standard user code 116. If a job specifies the work job class, Job Submission Wrapper 120 duplicates the job command file with the intention of submitting two jobs: one to workA and one to workB. One of the two jobs is provided with additional function that determines a job-starting order. Table I below illustrates a preferred embodiment for the logical functions provided by Job Submission Wrapper 120.

TABLE I

Logic for the Job Submission Wrapper

If (job class = work)
    Copy job command file to a temp location
    Modify the job class from work to workA
    Submit the job ON HOLD
    $WorkALLid = LLid of the submitted job # Record the job
    ID of the workA job
    Modify the job class of the temp file to workB
    Modify the comment field of the temp file to include
    $WorkALLid
    Insert state detection logic (SDL) logic into the front of
    the job
    Submit the job ON HOLD
    $WorkBLLid = Llid of the submitted workB job
    Release hold for workB job
    Release hold of workA job
    } else { # this is a standard job
    Submit the original job command file with no modifications
Endif The job submission logic first determines if the job class is of a special type (for example, "work"). If so, the command file is copied to a temporary location and modified to alter the job class from work to workA. This job has no other alterations and is submitted "on hold" to the job queue. The "on hold" designation indicates that the job is on the job queue but that the scheduler ignores this job for scheduling consideration. Once the job is submitted, the scheduler jobID is recorded for use in the remainder of the script. The temporary file is next modified to alter the job class to workB. In addition, additional logic (State Detection Logic, SDL) is added to the very beginning of the job script. This logic is invoked at job run time to determine the current job state of the two jobs in the queue. Included in the specification for the SDL logic is the knowledge of the jobID of the previously submitted workA job. Once these additions are complete, the workB job is also submitted on hold. Finally, the hold is released for the workB job and the workA job. Since the jobs are now both on the job queue, the scheduler considers them for scheduling once the appropriate resources become free. Note that the original function of the "work" job is preserved and duplicated in both the workA and workB jobs. In effect, two copies of the job are now on the job queue. Table II below illustrates the logic behind the SDL function.

TABLE II logic for the SDL function $WorkAStatus = get status of WorkA job
if $WorkAStatus is NOT Idle (that is, WorkAStatus is ST, R, Completed,
or it is gone)
    # WorkA started first, WorkB (this job) started second and
    needs to be cancelled
    exit this job
    Else # WorkA is idle, WorkB started first
        llcancel WorkA # Remove WorkA job from the job queue
        Check the job queue to make sure WorkA is gone
Endif As the WorkB job starts, it first runs the SDL function. The SDL function code obtains the status of the workA job. If the workA job is not idle, it must have started first. That means the original job has already run. Therefore, workB may exit immediately without running the user code. If workA is idle, then workB is the first job to run. Therefore, the workA job is cancelled by the SDL function. Once workA is cancelled, SDL completes and the job continues to run the user code. Table III below illustrates the function of the SDL logic when different start conditions occur for the workA and workB jobs.

TABLE III job start functional chart using the SDL function.

| Order of job start | SDL decision |
| --- | --- |
| WorkA Starts First | When workB starts, SDL causes workB to exit |
| WorkB Starts First | SDL runs and cancels workA |
| WorkA and WorkB start simultaneously | WorkA begins to execute user code. WorkB runs and recognizes workA is running. SDL causes job workB to exit. |

The new concepts provided herein are illustrated using an example with only two job classes, workA and workB. The idea is equally applicable to situations which include more than two special job classes. In addition, the example provided above shows the new functionality of the present invention being employed in a situation where workA and workB resource classes are disjoint, as seen in FIG. 1. The present invention is also, however, equally applicable to situations in which these resources overlap. The functionality of the present invention is easily included in a product such as LoadLeveler, a product offering of the assignee of the present invention.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for starting a job in a parallel batch job data processing system, said method comprising the steps of:

submitting a number of functionally identical jobs to a scheduler which submits said jobs to a plurality of resource classes in said data processing system; and removing any of said jobs from all resource classes except the first resource class which obtains sufficient resources to start one of said functionally identical jobs, said submitted functionally identical jobs including instructions which cause notification to said scheduler to effect said removal.

2. The method of claim 1 in which at least one of said plurality of resources possesses a capability which is different than at least one other one of said resources.

3. The method of claim 2 in which said capability is selected from the group consisting of speed, memory capacity, cache availability, disk access software license availability and connectivity.

4. A method for starting a job in a parallel batch job data processing system, said method comprising the steps of:

submitting a number of functionally identical jobs to a scheduler which submits said jobs to a plurality of resource classes in said data processing system;

including, within said functionally identical jobs, instructions which cause notification of job starting to said scheduler; and upon said notification, removing said job from all resource classes except the first resource class which obtains sufficient resources to start one of said functionally identical jobs.

* * * * *